United States Patent [19]

Herzog

[11] Patent Number: 5,050,723
[45] Date of Patent: Sep. 24, 1991

[54] BOTTLE ORIENTING DEVICE

[76] Inventor: Kenneth Herzog, 135 Industrial Blvd., Riverhead, N.Y. 11901

[21] Appl. No.: 606,771

[22] Filed: Oct. 31, 1990

[51] Int. Cl.$^5$ ............................................. B65G 47/24
[52] U.S. Cl. ...................................... 198/395; 198/400
[58] Field of Search ................ 198/392, 396, 395, 400

[56] References Cited

U.S. PATENT DOCUMENTS

| | | | |
|---|---|---|---|
| 3,446,335 | 5/1969 | Dubuit | 198/392 |
| 3,447,662 | 6/1969 | House | 198/395 |
| 4,530,430 | 7/1985 | Peterlini | 198/395 |
| 4,619,356 | 10/1986 | Dean et al. | 198/395 |

Primary Examiner—Joseph E. Valenza

[57] ABSTRACT

A device for orientating random bottles onto a conveyor is provided and consists of a mechanism which will turn random horizontal bottles into an upright position before filling and capping the bottles. Sensors in combination with a motor driven bottle orientation wheel will turn each captured bottle from a horizontal position to a vertical upright position and a pusher member that will move the bottles one after another to go onto the conveyor.

7 Claims, 2 Drawing Sheets

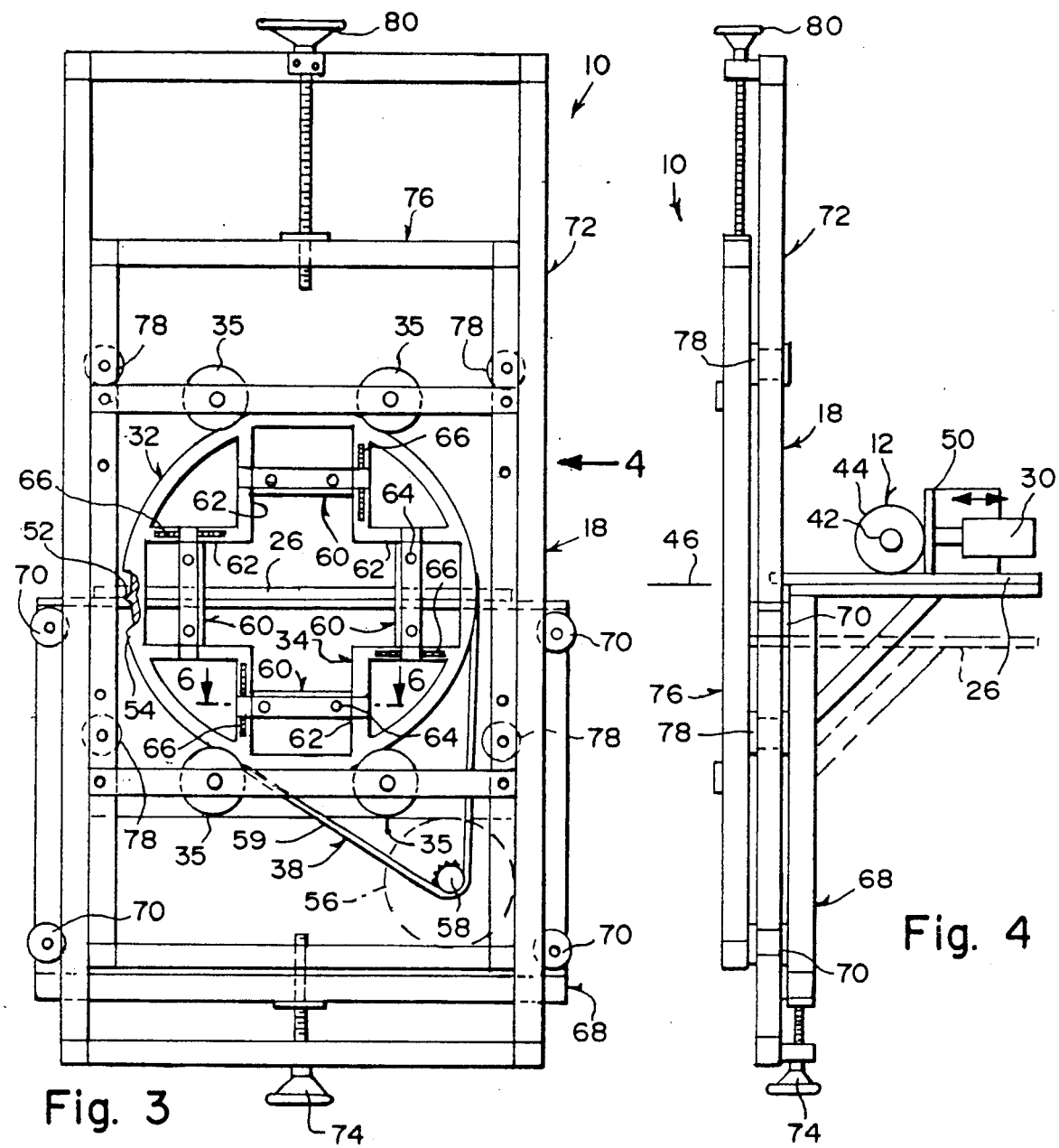
Fig. 3
Fig. 4
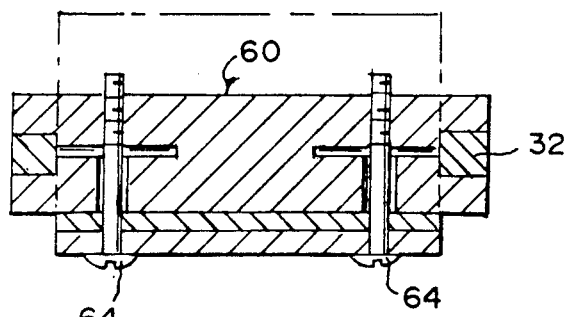
Fig. 6

BOTTLE ORIENTING DEVICE

BACKGROUND OF THE INVENTION

The instant invention relates generally to bottle positioning machines and more specifically it relates to a device for orientating random bottles onto a conveyor which provides a mechanism that aligns the bottles in an upright position before filing and capping.

There are available various conventional bottle positioning machines which do not provide the novel improvements of the invention herein disclosed.

SUMMARY OF THE INVENTION

A primary object of the present invention is to provide a device for orientating random bottles onto a conveyor that will overcome the shortcomings of the prior art devices.

Another object is to provide a device for orientating random bottles onto a conveyor that includes a mechanism which will turn randomly horizontal bottles into upright positions before filling and capping the bottles.

An additional object is to provide a device for orientating random bottles onto a conveyor that utilizes sensors in combination with a motor driven bottle orientation wheel which will turn each captured bottle from a horizontal position to a vertical upright position and a pusher member that will move them one after another onto the conveyor.

A further object is to provide a device for orientating random bottles onto a conveyor that is simple and easy to use.

A still further object is to provide a device for orientating random bottles onto a conveyor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is an enlarged front view with the feed drum and support frame removed therefrom.

FIG. 4 is a side view taken in direction of arrow 4 in FIG. 3, showing a portion of the stationary frame with the adjustable wheel and table frame.

FIG. 6 is an enlarged cross sectional view taken along line 6—6 in FIG. 3.

DETAILED DESCRIPTION OF THE PREFERRED EMBODIMENTS

Figure 1:
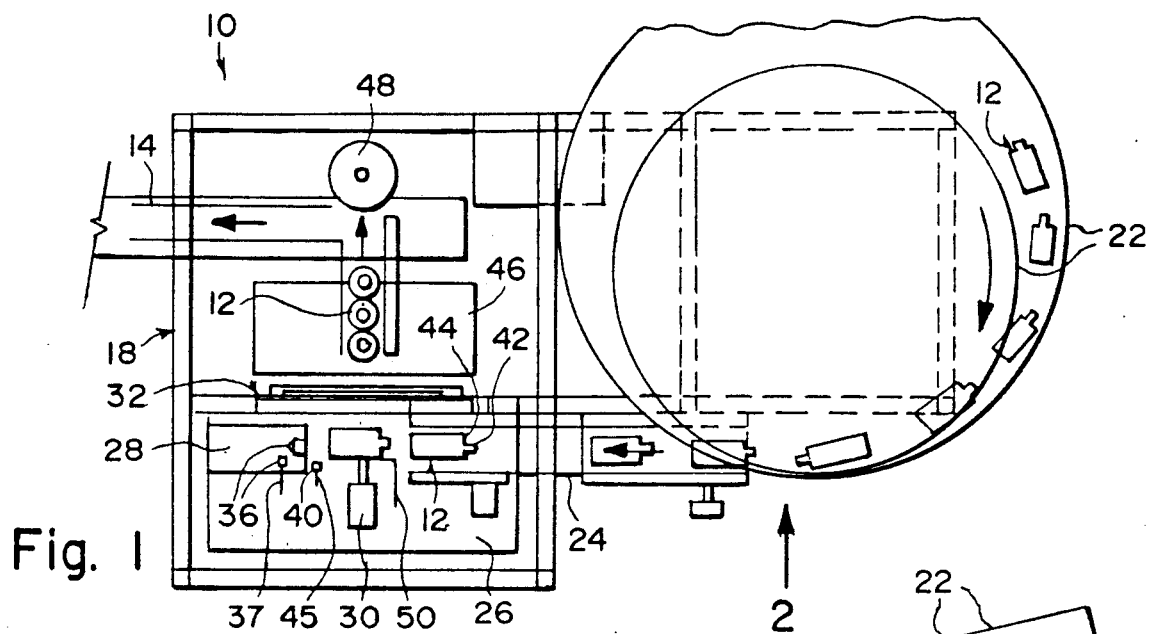
FIG. 1 is a diagrammatic top view of the instant invention.
Figure 2:
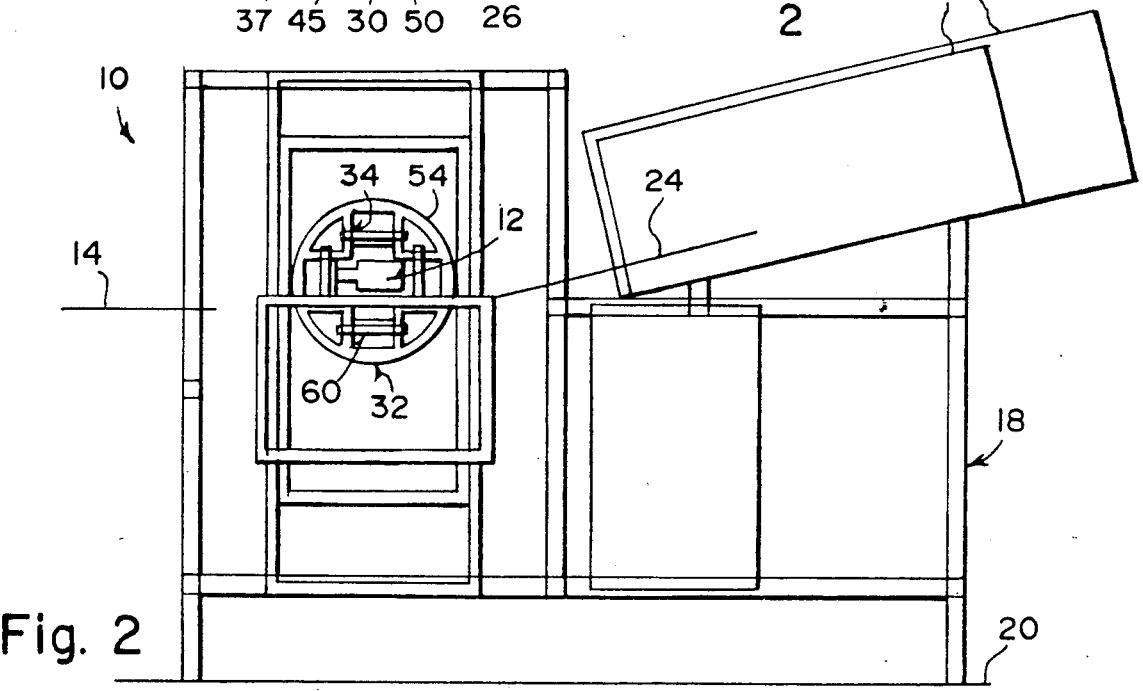
FIG. 2 is a diagrammatic front view taken in direction of arrow 2 in FIG. 1.
Figure 5:
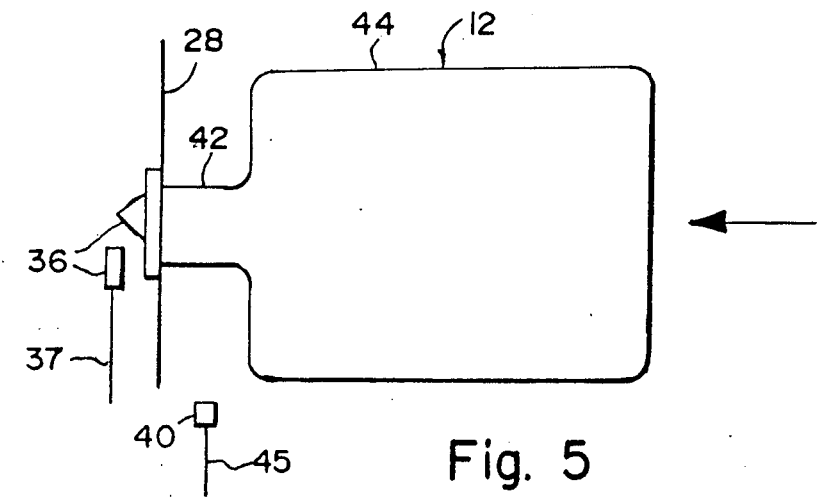
FIG. 5 is a diagrammatic top view showing the bottle sensors.

Turning now descriptively to the drawings, in which similar reference characters denote similar elements throughout the several views, the Figures illustrate a device 10 for orientating random bottles 12 onto a conveyor 14 consisting of a frame member 18 which sits upon a flat surface 20. A rotating feed drum 22 is carried on the frame member 18. The feed drum 22 is sized to hold a plurality of random deposited bottles 12 therein whereby a larger feed drum 22 is used for larger bottles 12. A chute 24 transports the random bottles 12 end to end from the feed drum 22. A table top 26 is carried on the frame member 18 and is located at the distal lower end of the chute 24. A stop member 28 is positioned on the table top 26 to retain one of the horizontal bottles 12. A push member 30 is positioned on the table top 26 transversely adjacent to the stop member 28. An orientation wheel 32 that has a plus sign shaped aperture 34 is rotatably carried between four rotors 35 on the frame member 18 opposite from the push member 30.

A first sensor 36 is located within the stop member 28 to register the presence of a horizontal bottle 12 against the stop member 28 so as to send a signal via a fiber optic cable 37 to the push member 30 to move the horizontal bottle 12 into the aperture 34 in the orientation wheel 32.

A mechanism 38 is for rotating the orientation wheel 132 clockwise and counterclockwise ninety degrees. A second sensor 40 is located on the table top 26 between the stop member 28 and the push member 30 to register the presence of the neck 42 or body 44 of the bottle 12 against the stop member 28. The second sensor 40 will send a signal via a fiber optic cable 45 to the rotating mechanism 38 to rotate the orientation wheel 32 clockwise ninety degrees when the body 44 of the bottle 12 is against the stop member 28 and rotate the orientation wheel 32 counterclockwise ninety degrees when the neck 42 of the bottle 12 is against the stop member 28. The bottle 12 will always be placed into an upright position.

A dead plate 46 is positioned adjacent the orientation wheel 32 opposite from the table top 26 so as to receive the upright bottle 12 when another horizontal bottle 12 is moved into the orientation wheel 32. A conveyor 14 is positioned at a right angle next to the dead plate 46 to receive each upright bottle 12. A guide roller 48 is carried on the conveyor 14 to cause each upright bottle 12 to make a ninety degree turn when going from the dead plate 46 onto the conveyor 14. The guide roller 48 also cushions the discharge of exiting bottles 12, if the conveyor 14 is positioned straight out from the dead plate 46.

The push member 30 includes an L-shaped bracket 50 to hold back a second horizontal bottle 12 when the push member 30 is moving a first horizontal bottle 12 into the aperture 34 of the orientation wheel 32. The rotating mechanism 38 includes a plurality of pins 52 spaced apart and located about the circumference 54 of the orientation wheel 32. A reversible motor 56 is mounted on the frame member 18 near the orientation wheel 32. A sprocket 58 is mounted on the shaft of the motor 56. A continuous chain 59 extends about the pins 52 on the circumference 54 of the orientation wheel 32 and the sprocket 58.

The device 10 further includes four leaf spring retainers 60. Each leaf spring retainer 60 is adjustably mounted into one arm area 62 of the plus sign shaped aperture 34 in the orientation wheel 32 by two screws 64, so as to be securely attached to the arm area 62 to hold the bottle 12 of any size herein. Four scales 66 are each carried on the orientation wheel 32 proximate one arm area 62 for repeating the settings after adjusting from one bottle size to another.

The frame member 18 further includes a first adjustable support structure 68 connected to the table top 26. Four rollers 70 are carried between the first adjustable support structure 68 and a stationary portion 72 of the frame member 18. A first hand wheel 74 is provided to raise and lower the first adjustable support structure 68 to change the height of the table top 26 for different sized bottles 12.

A second adjustable support structure 76 is for carrying the rotors 35 with the orientation wheel 32 thereon. Four rollers 78 are carried between the second adjustable support structure 76 and the stationary portion 72 of the frame member 18. A second hand wheel 80 is provided to raise and lower the second adjustable support structure 76 to change the height of the orientation wheel 32 to adjust with the dead plate 46 for different sized bottles 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is new and desired to be protected by Letters Patent is set forth in the appended claims:

1. A device for orientating random bottles onto a conveyor comprising:
   a) a frame member which sits upon a flat surface;
   b) a rotating feed drum carried on said frame member, said feed drum sized to hold a plurality of random deposited bottles therein;
   c) a chute to transport the random bottles end to end from said feed drum;
   d) a table top carried on said frame member and located at the distal lower end of said chute;
   e) a stop member positioned on said table top to retain one of the horizontal bottles;
   f) a push member positioned on said table top transversely adjacent to said stop member;
   g) an orientation wheel having a plus sign shaped aperture and rotatably carried between a plurality of rotors on said frame member opposite from said push member;
   h) a first sensor located within said stop member to register the presence of a horizontal bottle against said stop member so as to send a signal to said push member to move the horizontal bottle into the aperture in said orientation wheel;
   i) means for rotating said orientation wheel clockwise and counterclockwise ninety degrees;
   j) a second sensor located on said table top between said stop member and said push member to register the presence of the neck or body of the bottle against said stop member so as to send a signal to said rotating means to rotate said orientation wheel clockwise ninety degrees when the body of the bottle was against said stop member and rotate said orientation wheel counterclockwise ninety degrees when the neck of the bottle was against said stop member so that the bottle will always be placed into an upright position;
   k) a dead plate positioned adjacent said orientation wheel opposite from said table top so as to receive the upright bottle when another horizontal bottle is moved into said orientation wheel;
   l) a conveyor positioned next to said dead plate to receive each upright bottle; and
   m) a guide roller carried on said conveyor to cushion the discharge of each upright bottle to turn when going from said dead plate onto said conveyor.

2. A device as recited in claim 1, wherein said push member includes an L-shaped bracket to hold back a second horizontal bottle when said push member is moving a first horizontal bottle into the aperture of said orientation wheel.

3. A device as recited in claim 2, wherein said rotating means includes:
   a) a plurality of pins spaced apart and located about the circumference of said orientation wheel;
   b) a reversible motor mounted on said frame member near said orientation wheel;
   c) a sprocket mounted on the shaft of said motor; and
   d) a continuous chain extending about said pins on the circumference of said orientation wheel and aid sprocket.

4. A device as recited in claim 3, further including four leaf spring retainers, each adjustably mounted into one arm area of the plus sign shaped aperture in said orientation wheel so as to be securely attached to the arm area to hold the bottle of any size therein.

5. A device as recited in claim 4, further including four scales, each carried on said orientation wheel proximate one arm area for repeating the settings after adjusting from one bottle size to another.

6. A device as recited in claim 5, wherein said frame member further includes:
   a) a first adjustable support structure connected to said table top;
   b) a plurality of rollers carried between said first adjustable support structure and a stationary portion of said frame member; and
   c) a first hand wheel to raise and lower said first adjustable support structure to change the height of said table top for different sized bottles.

7. A device as recited in claim 6, wherein said frame member further includes:
   a) a second adjustable support structure for carrying said rotors with said orientation wheel therein;
   b) a plurality of rollers carried between said second adjustable support structure and the stationary portion of said frame member; and
   c) a second hand wheel to raise and lower said second adjustable support structure to change the height of said orientation wheel to adjust with said dead plate for different sized bottles.

* * * * *